United States Patent [19]
Åhman

[11] Patent Number: 5,693,301
[45] Date of Patent: Dec. 2, 1997

[54] METHOD FOR REMOVING SULPHUR DIOXIDE FROM A GAS

[75] Inventor: Stefan Åhman, Växjö, Sweden

[73] Assignee: ABB Fläkt AB, Stockholm, Sweden

[21] Appl. No.: 718,404

[22] PCT Filed: Feb. 27, 1995

[86] PCT No.: PCT/SE95/00203

§ 371 Date: Sep. 30, 1996

§ 102(e) Date: Sep. 30, 1996

[87] PCT Pub. No.: WO95/26807

PCT Pub. Date: Oct. 12, 1995

[30] Foreign Application Priority Data

Mar. 31, 1994 [SE] Sweden ................ 9401095

[51] Int. Cl.$^6$ ........................ B01D 53/50; B01D 53/80
[52] U.S. Cl. ............... 423/243.03; 423/243.03; 423/243.08; 423/244.07
[58] Field of Search ................. 423/243.03, 243.08, 423/244.07

[56] References Cited

U.S. PATENT DOCUMENTS

| | | | |
|---|---|---|---|
| 3,892,837 | 7/1975 | Uchiyama et al. | 423/242 |
| 4,263,021 | 4/1981 | Downs et al. | 55/73 |
| 4,853,195 | 8/1989 | Lento | 423/242 |
| 5,246,471 | 9/1993 | Bhat et al. | 55/223 |

FOREIGN PATENT DOCUMENTS

| | | | |
|---|---|---|---|
| 2928061 (A1) | 1/1980 | Germany | 423/243.03 |
| 3401038 (A1) | 7/1985 | Germany | 423/243.03 |
| 3-623982 (A1) | 7/1986 | Germany. | |
| 4875493 (A) | 10/1973 | Japan | 423/243.03 |
| 62-225226 (A) | 10/1987 | Japan | 423/243.08 |
| 3137918 (A) | 6/1991 | Japan | 423/243.03 |
| 357599 | 9/1993 | United Kingdom. | |

OTHER PUBLICATIONS

Kohl et al. "Gas Purification" 4th ed. Gulf Publishing Co. Houston, Texas U S A (1985, no month) pp. 319–320.

*Primary Examiner*—Gary P. Straub
*Assistant Examiner*—Timothy C. Vanoy
*Attorney, Agent, or Firm*—Birch, Stewart, Kolasch & Birch, LLP

[57] ABSTRACT

A method for removing sulphur dioxide from a gas, such as a flue gas, is disclosed. In the method, the sulphur-dioxide-containing gas is conducted upwards through at least one layer of aqueous absorbent suspension, whose absorbent is lime or limestone, the volume of the suspension layer being about 100–1000 l, calculated per $m^3$ of sulphur-dioxide-containing gas flowing through the layer every second, the static height of the layer being at least about 20 mm, preferably about 300–600 mm, and the gas flow through the layer being such that turbulence is generated in the layer, that the pH of the absorbent suspension is adjusted to about 3.0–5.5 with the aid of a buffer, preferably adipic acid, and that, separately from the sulphur-dioxide-containing gas, an oxygen-containing gas, preferably air, is supplied to the layer of absorbent suspension, preferably to the lower part of the layer of absorbent suspension and in such an amount that the molar ratio of oxygen to sulphur dioxide supplied to the suspension layer ranges from about 1:1 to about 25:1.

9 Claims, 1 Drawing Sheet

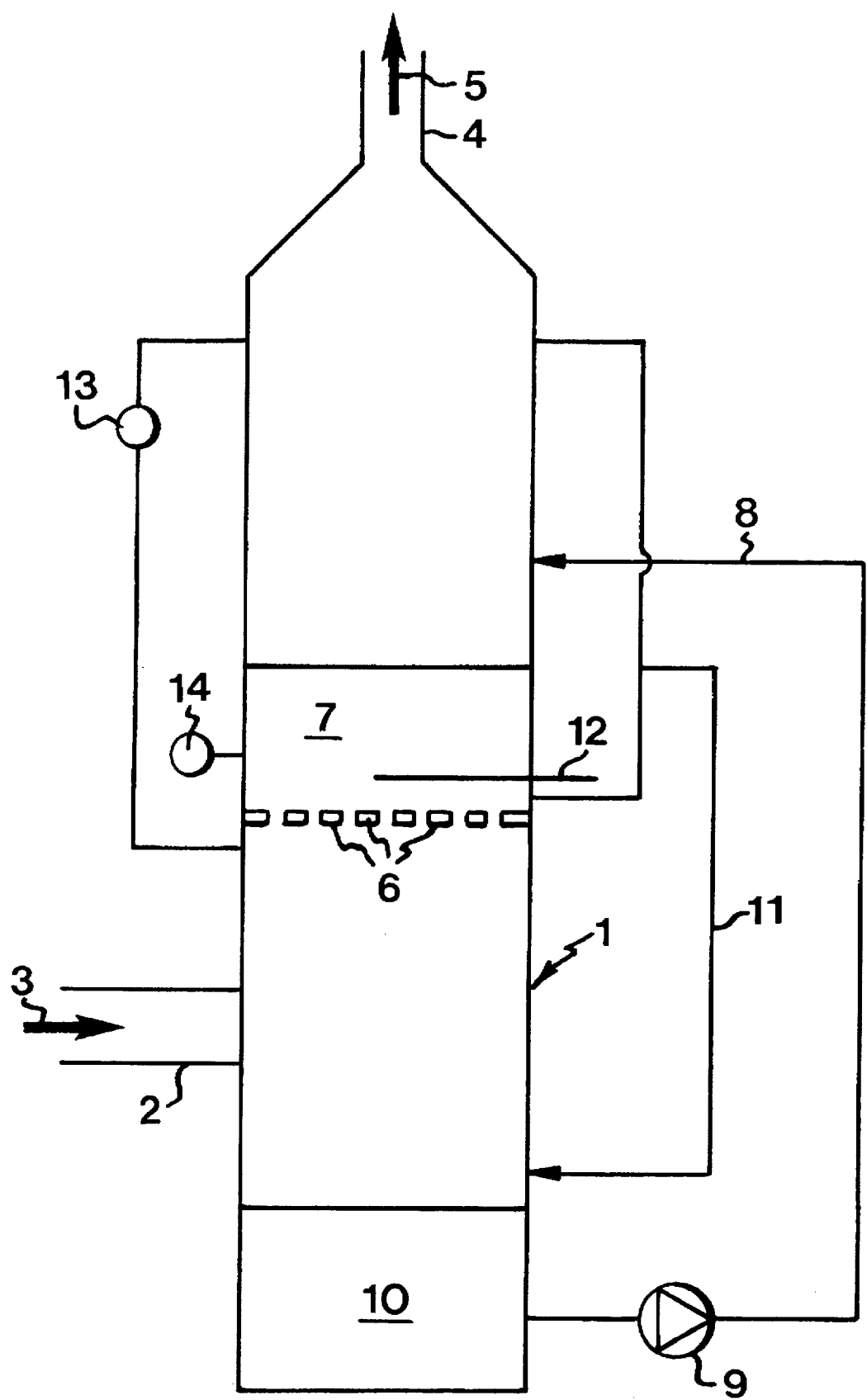

METHOD FOR REMOVING SULPHUR DIOXIDE FROM A GAS

This application is a 371 of PCT International application Ser. No. PCT/SE95/00203 filed 27 Feb. 1995.

FIELD OF THE INVENTION

The present invention relates to a method for removing sulphur dioxide from a gas, such as a flue gas, by means of an aqueous suspension of an absorbent.

BACKGROUND OF THE INVENTION

Sulphur dioxide is a gas formed upon the oxidation of sulphur-containing material, such as refuse, coal, oil, natural gas and peat. Even though this invention is especially concerned with the removal of sulphur dioxide from flue gases generated by the oxidation (combustion) of such material, it is by no means restricted thereto, but relates to the cleaning of sulphur-dioxide-containing gases in general. Such cleaning is previously known and is generally based on sulphur dioxide being absorbed in an aqueous washing liquid. At present, use is chiefly made of three different systems for cleaning sulphur-dioxide-containing flue gases, namely calcium-based systems, sodium-based systems and indirect calcium-based systems. In the calcium-based systems, limestone ($CaCO_3$) and lime ($CaO$, $Ca(OH)_2$) are used as alkali, whereas in the sodium-based systems, sodium hydroxide (NaOH) or soda ($Na_2CO_3$) is used as alkali. In the indirect calcium-based systems, a readily-soluble alkali, such as NaOH, is used for primarily absorbing the sulphur dioxide in a gas washer. Having absorbed sulphur dioxide, the washing liquid is regenerated outside the gas washer by means of a sparingly-soluble alkali, such as lime.

The present invention relates to the first-mentioned system and uses limestone or lime as alkali.

Prior-art calcium-based systems of this type include a washing tower, in most cases a spray tower, into which flue gas is introduced and treated concurrently with an injected suspension of fine-grained limestone or lime as absorbent. When contacted with the finely-divided absorbent suspension, the sulphur dioxide is absorbed to form, after oxidation, gypsum ($CaSO_4.2H_2O$) with the absorbent. The flue gas thus rid of sulphur dioxide then leaves the spray tower. In order to bring about the required oxidation and gypsum formation, oxygen-containing gas, such as air, is injected into the absorbent suspension, usually in the tank employed as storage means and for recycling of the absorbent suspension. As a rule, large suspension flows are recycled through the spray tower, and the storage tank contains a very large volume of absorbent suspension. As an example, it may be mentioned that the suspension volume in installations for flue-gas cleaning in power stations may exceed 1000 $m^3$, and volumes of up to 6000 $m^3$ occur. Such large volumes are seen as necessary in order to efficiently use the oxygen-containing gas supplied, since the solubility of oxygen increases with the depth at which it is injected. Furthermore, a considerable volume of absorbent suspension is regarded as necessary in order that the absorbent supplied should have a sufficient holding time to be dissolved. Also, a long holding time is needed if the precipitated gypsum crystals are to grow and become easy to filter off. The holding time of the recycled suspension typically is in the range of 6–12 min, while the holding time of the formed gypsum often is about 20–30 h.

Apart from spray towers of the above type, the prior art encompasses the use of packed towers and plate columns (tray-type towers) for removing sulphur dioxide from flue gases. Also in these types of tower, the final oxidation to gypsum occurs in a separate tank having a considerable volume, as stated above.

In jet bubbling reactors of the type marketed by Chiyoda Chemical Engineering and Construction Company, Ltd., all reactions occur in the same tank but in separate zones. Sulphur-dioxide-containing gas is injected from above and downwards in a jet bubbling zone. Then the gas rises upwards through the jet bubbling zone and leaves the jet bubbling reactor. Below the jet bubbling zone there is a reaction zone which is provided with an agitator and to which limestone slurry is added. Below the reaction zone, there are means for supply and dissolution of oxygen (air). Thus, oxygen is not supplied direct to the reaction zone. The construction with separate zones results in a great tank volume.

The above-mentioned prior art involves bulky constructions and huge volumes of absorbent suspension, and it would be advantageous to provide a method enabling a high degree of absorption of sulphur dioxide, an efficient utilisation of the absorbent, a low sulphite-ion concentration in the absorbent suspension, i.e. a low risk of unwanted precipitation of calcium sulphite, and requiring a small volume of absorbent suspension and, consequently, enabling a compact design.

DESCRIPTION OF THE INVENTION

The present invention achieves this aim by providing a method which combines a number of essential measures, as will be described in more detail below.

Further characteristics of the invention are recited in the appended claims.

Thus, the invention provides a method for removing sulphur dioxide from a gas, such as a flue gas, by means of an aqueous suspension of an absorbent selected from lime and limestone, characterised in that the sulphur-dioxide-containing gas is conducted upwards through at least one layer of the aqueous absorbent suspension, said layer having a volume of about 100–1000 l, calculated per $m^3$ of sulphur-dioxide-containing gas flowing through the layer every second, and having a static height of at least about 20 mm, and the gas flow through said layer being such that turbulence is generated in the layer, that the pH of the absorbent suspension adjusted to about 3.0–5.5 with the aid of a buffer, and that, separately from the sulphur-dioxide-containing gas, an oxygen-containing gas, preferably air, is supplied to the layer of absorbent suspension.

According to the invention, it is preferred that the sulphur-dioxide-containing gas is conducted upwards through at least one apertured plate and, provided thereon, a layer of the aqueous absorbent suspension, and that the difference in pressure over the apertured plate and the layer at least corresponds to the static height of said layer. Therefore, the invention will be described below with reference to the preferred use of an apertured plate.

Especially characteristic of the invention is that the contact between the sulphur-dioxide-containing gas and the absorbent suspension occurs in a layer of absorbent suspension, the gas being conducted from below through the layer of absorbent suspension, and that simultaneously an oxygen-containing gas, preferably air, is supplied to the layer of absorbent suspension separately from the sulphur-dioxide-containing gas. If the layer of absorbent suspension is provided on an apertured plate and the gas is conducted from below through the apertures of the apertured plate, the oxygen-containing gas can be supplied through e.g. separate apertures in the apertured plate or through special injection nozzles opening at the upper side of the apertured plate. The oxygen-containing gas thus is supplied to the lower part of the layer of absorbent suspension and as close as possible to its bottom to make the contact time between the oxygen-containing gas and the absorbent suspension as long as possible. The oxygen-containing gas can be supplied through a single inlet conduit, but it is preferred that the gas be supplied in a plurality of positions which are separated from the apertures in the apertured plate, through which the sulphur-dioxide-containing gas is supplied. The supply of the oxygen-containing gas can then occur through a plurality of injection nozzles being arranged just above the upper side of the apertured plate and in such a manner that the nozzles do not open above the apertures in the apertured plate, through which the sulphur-dioxide-containing gas is supplied. Alternatively, the oxygen-containing gas can be supplied through apertures in the apertured plate which are separated from the apertures through which the sulphur-dioxide-containing gas is supplied and may, for example, alternate with these.

The supplied amount of oxygen-containing gas should be such as to allow all the sulphur dioxide to oxidise, and thus the molar ratio of supplied oxygen to sulphur dioxide supplied to the layer of absorbent suspension is at least about 1:1 and preferably in the range of about 1:1 to about 25:1. By injection of the oxygen-containing gas and its oxidation of absorbed sulphur dioxide, the sulphite-ion concentration in the suspension is reduced, which diminishes the risk of deposits, since the degree of saturation of sulphite is reduced. Another favourable effect ensuing from the reduced sulphite-ion concentration is the reduction in the equilibrium-vapour pressure for sulphur dioxide over the suspension, enabling a higher degree of separation for sulphur dioxide. Also, the reduced sulphite-ion concentration promotes the dissolution of absorbent (lime). The consumption of energy for supplying the oxygen-containing gas is insignificant, since only energy corresponding to the static height of the layer of absorbent suspension is consumed.

The flow of sulphur-dioxide-containing gas conducted upwards through the apertured plate and the layer of absorbent suspension should be such that there is good contact between the suspension and the gas. To this end, the contact time and the contact surface should be maximised. The contact time increases as the velocity of the gas decreases and as the height of the suspension layer increases. The velocity of the gas is affected by the open area or aperture area of the apertured plate, i.e. the number of apertures and their dimensions. Thus, the velocity of the gas decreases as the aperture area increases. According to the invention, the free aperture area of the apertured plate preferably is about 1–60%, more preferred about 1–10%, and a free aperture area of about 3–5% is most preferred at present. In order to achieve good contact between the suspension and the gas, the gas flow should, moreover, be such that turbulence is generated in the suspension layer.

Even though a low velocity of the gas promotes good contact between the suspension layer and the gas, the velocity of the gas must not be too low, since the absorbent suspension begins to "leak" through the apertured plate, i.e. the pressure of the upwardly directed gas flow is no longer sufficient to retain the absorbent suspension on the apertured plate, but this flows down through the apertures in the plate, when the velocity of the gas goes below a certain level. According to the invention, the gas flow through the layer of absorbent suspension should be such that the pressure difference over the apertured plate and the layer at least corresponds to the static height of the layer. There is no clear, critical upper limit for the gas flow, but if the gas flow increases too much, the absorbent suspension will be entrained by the gas flow and leave with the departing gas. If the gas flow is kept within these limits, one may achieve a state in which the suspension layer is retained on the apertured plate while good contact between the suspension and the gas is ensured. In general, the velocity of the gas flow is about 20–60 m/s, preferably about 35–50 m/s, measured as the velocity of the gas through the apertures of the plate.

The contact between the sulphur-dioxide-containing gas and the absorbent suspension is also affected by the height of the layer of absorbent suspension. Thus, the higher the layer, the better the contact, as a result of the prolonged contact time. According to the invention, a lower limit for the height of the layer is at least about 20 mm, preferably at least about 50–100 mm. Below this height, the layer is too thin to enable satisfactory contact between the suspension and the gas. There is no critical upper limit for the height of the layer, but it has, according to the invention, been found that a height above about 600 mm does not entail any further advantages of any importance as regards the separation of sulphur dioxide. According to the invention, it has also been found that the static height of the suspension layer preferably is at least about 300 mm, if optimum results are to be obtained. Consequently, it is preferred that the static height of the layer of absorbent suspension is about 300–600 mm.

A further important and characteristic parameter of the invention is the volume of absorbent suspension on the apertured plate through which flows 1 $m^3$ of sulphur-dioxide-containing gas per second. This volume is affected by the static height and the surface of the suspension layer. Thus, the smaller the volume, the more effective the method. According to the invention, the volume is about 100–1000 l, preferably about 200–300 l. With a volume below about 100 l, the absorption of sulphur dioxide is unsatisfactory, whereas a volume exceeding about 1000 l does not entail any further advantages. These volumes should be compared with conventional systems for wet flue gas cleaning, in which a volume for the oxidation tank of about 7500–15000 l is required for a gas flow of 1 $m^3/s$.

Another important feature of the present invention is that the pH of the absorbent suspension is adjusted to about 3.0–5.5, preferably about 3.5–5.0 with the aid of a buffer. There are various known buffers, such as organic acids, inorganic acids and organic amines, which may be selected by the expert, there being no need of any extensive enumeration here. However, it may be mentioned that suitable buffers include monocarboxylic acids, such as formic acid, acetic acid, and propionic acid; polycarboxylic acids, such as succinic acid, adipic acid, phthalic acid, isophthalic acid and citric acid; hydroxy-substituted acids, such as Glycolic acid and lactic acid; and sulphocarboxylic acids, such as sulphopropionic acid and sulphosuccinic acid. Amongst these buffers, adipic acid, lactic acid, sulphopropionic acid and sulphosuccinic acid are of special interest. According to the invention, the buffer added preferably is a weak organic acid having a pKa in the range of 3–5, especially adipic acid. The buffer is added in the amount required to adjust the pH of the adsorbent suspension to about 3.0–5.5. In General, the amount of buffer added is about 100–5000 ppm, preferably about 500–2500 ppm. The reason for adjusting the pH of the suspension is that it reduces the pH decrease at the interface between the sulphur-dioxide-containing gas and the absorbent suspension and thus improves the absorption of $SO_2$. The adding of the buffer also improves the dissolution of absorbent (lime, limestone). The buffer may be added to the absorbent suspension in advance, before being supplied to the apertured plate, or the buffer can be supplied directly to the suspension layer on the apertured plate.

By proceeding according to the invention, it is possible to achieve a very high degree of absorption of sulphur dioxide of 98% or more.

BRIEF DESCRIPTION OF THE DRAWING

FIG. 1 illustrates the apparatus used for the process of the invention.

DESCRIPTION OF THE DRAWING

In order to further facilitate the understanding of the invention, it should be elucidated by some non-restrictive Examples and comparative Examples. In these Examples, use is made of a device which is shown schematically in longitudinal section in the accompanying drawing and which will be described below. The device is an example how the invention can be accomplished.

The device consisted of a vertical tower 1 of circular cross-section. At the lower part of the tower there was an inlet 2 for sulphur-dioxide-containing gas 3, and at the upper part of the tower there was an outlet 4 for treated gas 5. The sulphur-dioxide-containing gas 3 flowed upwards through the tower 1, and between the inlet 2 and the outlet 4 there was a permeable bottom 6 in the form of an apertured plate. The apertured plate could be replaced, as stated in more detail in the Examples. On the apertured plate, there was supplied a suspension 7 of water and absorbent which was selected from lime or limestone. Preferably also a buffer was added. The absorbent suspension was supplied via a conduit 8 by means of a pump 9 from a storage means 10 of about 100 l absorbent suspension that was arranged in the bottom part of the tower. The height of the layer of absorbent suspension over the apertured plate could be adjusted by means of a drain conduit 11. Air could be injected via a conduit 12 by means of a nozzle which opened just above the apertured plate 6 and was separated from the apertures of the apertured plate. The total pressure drop over the apertured plate and the suspension layer was measured by means of a pressure gauge 13, and the pH of the suspension layer was measured by means of a pH meter 14.

Even though the used device had only one apertured plate, it will be realised that according to the invention it is possible to use devices with two or more apertured plates arranged one above the other, or that, for instance, the apertured plate can be replaced with some other equivalent means, such as a bubble tray.

EXAMPLE 1 (COMPARATIVE)

In this Example, the above-described device was fitted with an apertured plate having an open area of 5.4% and four symmetrically distributed apertures having a diameter of 25 mm.

The absorbent used was dry-slaked lime having such a particle size that about 96% thereof passed a sieve having a mesh width of 44 µm.

An absorbent suspension containing about 11% by weight of absorbent and having a pH of 5.3 was supplied to the upper side of the apertured plate. No buffer was added to the absorbent suspension. The static height of the layer of absorbent suspension was set at 400 mm.

Subsequently, a sulphur-dioxide-containing gas having a sulphur dioxide concentration of 1461 ppm was injected through the inlet of the device and through the apertured plate and the suspension layer, whereby the gas caused vivid turbulence in the layer. The injection of gas caused expansion of the suspension layer to a height of 1100 mm, and the total pressure drop was measured to be 480 mm water column. Moreover, the velocity of gas through the nozzles was determined to be 35.2 m/s. The low velocity of gas resulted in a noticeable leakage of suspension through the apertured plate. The volume of the suspension layer was 14.5 l, and the suspension volume through which flowed 1 m³ of gas per second was 210.5 l.

Simultaneously with the sulphur-dioxide-containing gas, a separate supply of air to the suspension layer was carried out, as described above. The added amount of air was such that the molar ratio of oxygen to sulphur dioxide was 10:1.

The oxidation of the absorbed sulphur dioxide amounted only to 88.3%, and the lime excess was 24%, i.e. only 81% of the supplied lime was used to bind sulphur dioxide. The content of sulphite ions ($SO_3^{2-}$) in the suspension was determined to be 2300 ppm.

An analysis of the gas departing from the device showed a sulphur-dioxide concentration of 210 ppm, i.e. only 85.5% of the sulphur dioxide was removed.

EXAMPLE 2 (COMPARATIVE)

This experiment was carried out in conformity with Example 1, but the apertured plate was amended to have only two apertures and an aperture area of 3.46%, whereby the velocity of the gas increased to 46 m/s. Owing to the higher gas velocity, there was no leakage of absorbent suspension through the apertured plate. The absorbent suspension was of the same type as in Example 1, but contained 19% by weight of absorbent and had a pH of 4.6. Also in this Example, no buffer was added to the absorbent suspension. The static height of the suspension layer was 390 mm, and its expanded height 1100 mm, which resulted in a suspension layer volume of 14.2 l and a volume of the suspension through which 1 m³ of sulphur-dioxide-containing gas flowed per second, of 244 l. Such an amount of air was supplied that the molar ratio oxygen:sulphur dioxide was 20:1. The oxidation of absorbed sulphur dioxide was determined to be 87.6%, while 93% of the supplied lime was used to bind absorbent sulphur dioxide. The sulphite-ion concentration in the absorbent suspension was measured to be 1450 ppm, which exceeds the degree of saturation for precipitation of calcium sulphite. The entering sulphur-dioxide-containing gas had a sulphur-dioxide concentration of 1900 ppm, while the departing gas had a concentration of 173 ppm, i.e. 90.9% of the sulphur dioxide was removed.

EXAMPLE 3 (COMPARATIVE)

In this Example, the same design of the device was used as in Example 2. The absorbent suspension contained 15% by weight of slaked lime as absorbent and had a pH of 4.4. In this Example, a buffer consisting of adipic acid in an amount of 1000 ppm was added to the absorbent suspension. The static height of the suspension layer on the apertured plate was 390 mm, and the expanded height was 1100 mm. The volume of the suspension layer was 14.2 l, and the suspension volume through which 1 m³ of gas flowed per second was 247 l. The sulphur-dioxide-containing gas had a velocity through the apertures of the plate of 46 m/s and the total pressure drop was measured to be 545 mm water column. Originally the gas contained 1983 ppm of sulphur dioxide, while the departing gas contained only 32 ppm of sulphur dioxide, i.e. 98.4% of the sulphur dioxide was removed. During the experiment, air was injected into the suspension layer in such an amount that the molar ratio oxygen:sulphur dioxide was 17, 3, whereby the absorbed sulphur dioxide was oxidised to an extent of 99.7%. 95% of the added lime was used to bind absorbed $SO_2$. The content of sulphite ions in the absorbent suspension amounted to 200 ppm only, i.e. there was no the risk of any unwanted precipitation of calcium sulphite.

EXAMPLE 4 (COMPARATIVE)

In this Example, an apertured plate with 12 apertures having a diameter of 14 mm was used. The open area of the apertured plate was 5.1%.

The absorbent suspension consisted of water containing 21.5% by weight of limestone having such a particle size that 94% thereof passed a sieve having a mesh width of 44 m. The pH of the suspension was 4.4. No buffer was added. The static height of the suspension on the apertured plate was 320 mm, and the expanded height was 950 mm. The volume of the suspension layer was 11.6 1, and the suspension volume through which 1 m³ of sulphur-dioxide-containing gas flowed per second was 174 1. The sulphur-dioxide-containing gas supplied contained 1930 ppm of sulphur dioxide and its velocity through the apertures of the apertured plate was 36 m/s. The total pressure drop was measured to be 445 mm water column. Air was injected into the suspension layer in such an amount that the molar ratio oxygen:sulphur dioxide was 17:1.98.9% of the absorbed sulphur dioxide was oxidised, while only about 33% of the added lime was used to bind absorbed sulphur dioxide. In the absorbent suspension, a content of sulphite ions of 3970 ppm was measured, which exceeds the degree of saturation for calcium sulphite, i.e. the risk of undesirable precipitation of calcium sulphite was considerable.

The sulphur-dioxide concentration of the departing gas was 328 ppm, which implied that only about 83% of the sulphur dioxide was removed.

EXAMPLE 5 (COMPARATIVE)

In this Example, an apertured plate with four apertures having a diameter of 20 mm was used. The open area of the apertured plate was 3.5%.

The absorbent suspension consisted of water containing 26.5% by weight of limestone having such a particle size that 94% thereof passed a sieve having a mesh width of 44 m. 900 ppm of adipic acid was added as buffer to the suspension. The pH of the suspension was 4.6. The static height of the suspension layer on the apertured plate amounted to 390 mm, and the expanded height was 1100 mm. The volume of the suspension layer was 14.2 1, and the suspension volume through which 1 m³ of sulphur-dioxide-containing gas flowed per second was 247 1.

The entering gas contained 1984 ppm of sulphur dioxide and had a velocity through the apertures of the apertured plate of 46 m/s. The total pressure drop was 595 mm water column.

In this Example, no air was injected into the suspension layer. An analysis of the absorbent suspension showed that only 55% of the limestone had been utilised, i.e. the excess of limestone was 83%. Moreover, the content of sulphite ions was 1280 ppm, i.e. the risk of undesirable precipitation of calcium sulphite was great.

The departing gas contained 144 ppm of sulphur dioxide, i.e. 93% of the sulphur dioxide was removed.

EXAMPLE 6

In this Example, the same device with the same apertured plate was used as in Example 5. The absorbent suspension consisted of water having 15.5% by weight of limestone which had such a particle size that 94% thereof passed a sieve having a mesh with of 44 m. Further, 1050 ppm of adipic acid was added as buffer to the suspension. The pH of the suspension was 4.4. The static height of the suspension layer on the apertured plate was 390 mm and the expanded height 1250 mm. The volume of the suspension layer was 14.2 1, and the suspension volume through which 1 m³ of gas flowed per second was 247 1.

The entering gas contained 1969 ppm of sulphur dioxide and had a flow rate of 46 m/s through the apertures of the apertured plate. The total pressure drop was 545 mm water column.

Into the suspension layer on the apertured plate, air was injected in such an amount that the molar ratio oxygen:sulphur dioxide was 16. The absorbed sulphur dioxide was oxidised almost completely, or up to 99.95%. The excess of non-used limestone was 9%, i.e. 92% of the limestone was used. The absorbent suspension had a very low content of sulphite ions, viz. 70 ppm, which implied that there was no risk of any undesirable precipitation of calcium sulphite.

The departing gas contained 19 ppm of $SO_2$, which implied that 99% of the sulphur dioxide was removed.

To sum up, it appears from the above Examples that while Examples 3 and 6, which are according to the invention, gave very satisfactory results with a high degree of oxidation, a low content of sulphite ions and a high degree of separation of sulphur dioxide, the remaining Examples gave unsatisfactory results since they do not satisfy the requirements according to the invention. For instance, no buffer was added in Example 1, resulting in the sulphite-ion concentration being unsatisfactorily high in the suspension, the degree of oxidisation and the utilisation of lime being low and the removal of sulphur dioxide being unsatisfactory. This also applies to Example 2. Also in Example 4, no buffer was added, resulting in the sulphite-ion content being undesirably high and the utilisation of lime being extremely poor, just as the removal of sulphur dioxide. On the other hand, the degree of oxidation was comparatively high, which may be caused by the powerful injection of air. In Example 5, no air was injected, and therefore the sulphite-ion content was unacceptably high and the utilisation of absorbent unsatisfactory, just as the removal of sulphur dioxide. The high degree of oxidation is caused by the addition of adipic acid buffer.

It will be understood from the above results that it is important that all requirements of the invention, as defined in the accompanying claims, be satisfied in order to achieve the object of the invention.

I claim:

1. A method for removing sulphur dioxide from a gas by means of an aqueous suspension of an absorbent selected from lime and limestone, comprising the steps of:

conducting the sulphur-dioxide-containing gas upwards through at least one apertured plate and a layer of the aqueous absorbent suspension disposed on said apertured plate, the difference in pressure over the apertured plate and the layer at least corresponding to the static height of the layer; said at least one layer of the aqueous absorbent suspension having a pH of about 3.0–5.5 which is buffered with a weak organic acid having a pKa in the range of 3–5, the layer having a volume of about 100–1000 1, calculated per m³ of sulphurdioxide-containing gas flowing through the layer every second, and a static height of at least about 20 mm, the gas flow through the layer being such that turbulence is generated in said layer; and separately from the sulphur-dioxide-containing gas, and during said conducting step, supplying an oxygen-containing gas to the lower part of the layer of absorbent suspension disposed on said apertured plate.

2. A method as claimed in claim 1, wherein the oxygen-containing gas is supplied in a plurality of locations which are separated from the apertures in the apertured plate, through which the sulphur-dioxide-containing gas is supplied.

3. A method as claimed in claim 1, wherein the oxygen-containing gas is supplied in such an amount that the molar ratio of oxygen to sulphur dioxide supplied to the layer of absorbent suspension is in the range of about 1:1 to about 25:1.

4. A method as claimed in claim 1, wherein the static height of the layer of absorbent suspension is about 300–600 mm.

5. A method as claimed in claim 1, wherein the volume of the layer of absorbent suspension is about 200–300 l, calculated per $m^3$ of sulphur-dioxide-containing gas flowing through the layer every second.

6. A method as claimed in claim 1, wherein said weak organic acid is adipic acid.

7. A method as claimed in claim 1, wherein the sulphur-dioxide-containing gas is conducted through at least one apertured plate having a free aperture area of about 1–60%.

8. A method for removing sulphur dioxide from a gas as claimed in claim 1 wherein said gas is flue gas.

9. A method as claimed in claim 1, wherein said oxygen-containing gas is air.

* * * * *